United States Patent
Zampetti et al.

(10) Patent No.: US 8,427,963 B2
(45) Date of Patent: Apr. 23, 2013

(54) METHOD AND SYSTEM FOR ANALYZING AND QUALIFYING ROUTES IN PACKET NETWORKS

(75) Inventors: George P. Zampetti, Livermore, CA (US); Kishan Shenoi, Saratoga, CA (US)

(73) Assignee: Symmetricom, Inc., San Jose, CA (US)

( * ) Notice: Subject to any disclaimer, the term of this patent is extended or adjusted under 35 U.S.C. 154(b) by 369 days.

(21) Appl. No.: 12/830,270

(22) Filed: Jul. 2, 2010

(65) Prior Publication Data

US 2011/0122775 A1 May 26, 2011

Related U.S. Application Data

(60) Provisional application No. 61/263,264, filed on Nov. 20, 2009, provisional application No. 61/318,170, filed on Mar. 26, 2010.

(51) Int. Cl.
*H04L 12/26* (2006.01)

(52) U.S. Cl.
USPC .................................. 370/242; 370/503

(58) Field of Classification Search .................. 370/503, 370/242, 248, 229–235
See application file for complete search history.

(56) References Cited

U.S. PATENT DOCUMENTS

| | | | |
|---|---|---|---|
| 5,751,777 A | 5/1998 | Zampetti | |
| 5,943,381 A | 8/1999 | Zampetti | |
| 8,219,129 B2 * | 7/2012 | Brown et al. | 455/502 |
| 2009/0147806 A1 * | 6/2009 | Brueckheimer | 370/503 |
| 2009/0310485 A1 * | 12/2009 | Averi et al. | 370/232 |

OTHER PUBLICATIONS

U.S. Appl. No. 12/558,297, "Method and Apparatus for Monitoring Packet Networks," filed on Sep. 11, 2009.
U.S. Appl. No. 12/632,643, "Method and Apparatus for Finding Latency Floor in Packet Networks," filed on Dec. 7, 2009.
IEEE Std. 1588-2008, "IEEE Standard for a Precision Clock Synchronization Protocol for Networked Measurement and Control Systems," 2008.
Shenoi, Kishan. "Synchronization and Timing in Telecommunications," ISBN 1-4392-2632-6, Ch. 2, Sec. 2.3, pp. 39-69 (2009).
"Timing and Synchronization Aspects in Packet Networks," ITU-T Recommendation G.8261/Y.1361, Apr. 2008.

* cited by examiner

*Primary Examiner* — Gary Mui
(74) *Attorney, Agent, or Firm* — Patterson & Sheridan, L.L.P.

(57) ABSTRACT

Routes of a packet network are analyzed according to various transit delay metrics. Preferred packet network routes are selected between source and destination based on these metrics. In packet networks employing boundary clocks and transparent clocks, faulty boundary clocks and faulty transparent clocks are identified using the metrics.

20 Claims, 4 Drawing Sheets

METHOD AND SYSTEM FOR ANALYZING AND QUALIFYING ROUTES IN PACKET NETWORKS

CROSS-REFERENCE TO RELATED APPLICATIONS

This application claims the benefit of U.S. Provisional Patent Application 61/263,264, filed Nov. 20, 2009, and U.S. Provisional Patent Application 61/318,170, filed Mar. 26, 2010. Both of the foregoing applications are incorporated by reference herein.

BACKGROUND OF THE INVENTION

1. Field of the Invention

Embodiments of the invention relate generally to time and frequency alignment systems operating over digital communications networks and, more specifically, to a method and a system for analyzing and qualifying routes in packet networks.

2. Description of the Related Art

One of the more important requirements of a digital communication network is to support real-time communications applications, which typically require time or frequency alignment, or a combination of both. For example, time alignment may be used by real-time instrumentation systems gathering data at specific time intervals or operating machinery according to specific timing. Frequency alignment is typically useful to time division multiplex (TDM) systems and media streaming systems, which require fixed video or audio sample rates across multiple clients.

One approach known in the art that provides both time and frequency alignment involves generating (creating) an aligned time signal based on global positioning system (GPS) satellite timing signals, which are each held in precise alignment with a global clock reference. Using GPS signals to achieve time or frequency alignment is generally quite expensive and requires a client system to be able to receive the radio frequency (RF) signals from GPS satellites. In general, a more cost effective approach to time alignment is to transmit timing alignment information via a protocol that is operable within a given communications network.

In conventional TDM networks a physical layer methods implement frequency alignment throughout the network, starting with a designated master clock system. The designated master clock system delivers (frequency) timing information via bit-timing (or symbol-timing) information associated with downstream physical communication links. In normal operation each system coupled to the master clock system replicates the master clock timing information to downstream systems by replicating physical layer timing from the master clock system to each downstream system. Each system within the TDM network receives (frequency) timing information and aligns local (frequency) timing to an upstream clock reference, thereby enabling every system within the TDM network to achieve frequency alignment.

While frequency alignment within conventional TDM networks is relatively straightforward, packet networks, such as networks based on the popular Ethernet industry standards, present time and frequency alignment challenges because packet networks are not conventionally designed to provide precise delivery time for data or precise timing at any lower protocol levels. A key difference is that the switching and multiplexing functions are not as deterministic as circuit switching and TDM, but have a statistical aspect as well. The statistical nature of switching and multiplexing adds a different notion of quality of service. Whereas error performance is always important, the notions of delay variation and available bandwidth now come into play. For a given packet flow, such as for a circuit-emulated service, a certain minimum "bit rate" may be specified along with a measure of how much more bandwidth can be made available, depending on the level of network congestion. A Service Level Agreement (SLA) between the network provider and an end-user would specify, among other items, the guaranteed (minimum) bit rate (or equivalent) as well as the upper limit to packet delay variation and other factors that could be in jeopardy in situations of network congestion.

Furthermore, packet networks typically involve multiple nodes that may store and forward data packets, potentially introducing significant transit delay variation between any two points. To generally overcome certain time alignment challenges inherent in packet networks, certain time alignment protocols based on the industry standard internet protocol (IP) have been developed and deployed. One IP-based time alignment protocol is known in the art as the Network Time Protocol (NTP). NTP is used for aligning time between a master time reference and one or more clients. Precision Time Protocol (PTP) is a second IP-based time alignment protocol for aligning one or more client devices to a master time reference. PTP is defined in detail within the IEEE 1588® standard.

Persons skilled in the art will understand that NTP, PTP, and any other time alignment protocol transmitted through a packet network must account for transit delay variation within the network. In fact, overall time alignment accuracy is generally determined by the ability of a system implementing time alignment to account for transit delay variation between a time reference and a clock aligning to the time reference.

Lightly loaded packet networks typically present relatively low transit delay variation, allowing IP-based alignment protocols such as NTP and PTP to easily achieve excellent accuracy relative to each protocol's specification. For example, in a lightly loaded gigabit Ethernet-based network, PTP can theoretically provide alignment of better than one hundred nanoseconds. However, conventional networks typically have a wide range of bandwidth loading conditions, which leads to large transit delay variations. This transit delay variation typically leads to degradation of time alignment accuracy.

Furthermore, network elements comprising the packet network may process sequential packets differently, depending on prevailing congestion conditions that result from increased bandwidth loading within the network. For example, a network element may forward all packets according to one delay profile until a congestion threshold is exceeded. Once the congestion threshold is exceeded, the network element may delay high priority packets, and drop low priority packets. If congestion on the network element drops below the congestion threshold, then the network element may stop delaying high priority packets and stop dropping low priority packets.

Frequency alignment between a frequency reference (master clock) and a frequency client (slave clock) may be disrupted by abrupt changes in transit delays resulting from one or more intervening network elements switching form normal mode to congestion mode. Because conventional frequency alignment protocols presume transit delay does not change abruptly, a conventional client device commonly interprets a change in transit delay resulting from a network element changing between normal mode and congestion mode to be the result of a local frequency error. The conventional client device may adjust for the local frequency error, even though no adjustment is actually needed. Similarly, time alignment between a time reference (master) and a time client (slave) may also be disrupted by abrupt changes in transit delays resulting from one or more network elements switching from normal mode to congestion mode.

Thus, several factors, including network congestion and network element policies for packet processing, may contribute to greater transit delay variation in a packet network. Unfortunately, transit delay variation typically reduces accuracy and reliability of time and frequency alignment systems that conventionally depend on stability of transit delay within the packet network.

SUMMARY OF THE INVENTION

One or more embodiments of the invention provide a method and a system for analyzing and qualifying routes in packet networks using various transit delay metrics. According to embodiments of the invention, packet network routes are observed between source and destination and the potential performance of timing-transfer services that traverse the network following these routes is assessed.

The techniques for measuring and monitoring of transit delay and delay variation according to embodiments of the invention can be used for several network management functions. One application is congestion monitoring. Certain metrics computed from the delay measurements can describe the level of congestion in the network and armed with this knowledge suitable network management actions can be taken such as routing traffic around islands of congested segments.

A second application is the development of routing algorithms with "cost of routing" based not on number of hops, as in prior art, but on the ability of links to carry real-time traffic or traffic that is sensitive to transit delay variation such as services used for transport of timing. Examples of real-time traffic are VoIP (Voice over Internet Protocol), Video-over-IP, IPTV (Internet Protocol Television); examples of timing traffic are PTP (Precision Timing Protocol, i.e. IEEE 1588®) and NTP (Network Time Protocol).

A third application is the prediction of the performance of clock recovery methods based on adaptive clock recovery (ACR) over the network segment between the timing source and timing destination.

A fourth class of applications is the prediction of the performance of a packet-based slave (e.g., PTP slave or NTP client) that is exchanging timing messages with a master (e.g., PTP master or NTP server) across a packet network or various segments thereof. More specifically, if there are multiple paths possible between the master and the slave, the techniques according to embodiments of the invention identifies the "best path" or optimum route between the two units.

Also, in PTP the use of transparent clocks is considered to be a way of solving the packet delay variation problem. Intermediate nodes assist in measuring delay parameters that the slave can use to "eliminate" the packet delay variation. However, transparent clocks introduce clock noise and therefore it may not always be true that a route with network assist in the form of transparent clocks is better than a route without transparent clocks. The techniques according to embodiments of the invention identify the "best path" among paths, some of which may include transparent clocks, and also can be used to identify the presence of a rogue transparent clock.

In addition, if a slave has access to two or more masters, the techniques according to embodiments of the invention can be used to identify which is the better master. Similarly, if two or more slaves have a path to one master, the techniques according to embodiments of the invention can be used to identify congestion in the portion of the network that is not common to the paths between the slaves and the master. Furthermore, by having "shadow slaves" distributed over the network, the techniques according to embodiments of the invention can be used to generate a congestion map, allowing the network operator to identify, in real-time, parts of the network that are congested and thereby take appropriate corrective action. The shadow slaves can also be used to triangulate and identify rogue transparent clocks.

The analysis of the packet delay variation using the techniques according to embodiments of the invention can also establish the level of performance required from an oscillator to achieve a desired timing performance at the slave clock output and to establish the minimum packet rate required to support the desired timing performance at the slave clock output. This is advantageous because the required quality level of oscillator can be matched to the network characteristics such that a minimum cost oscillator can be deployed, and the network load generated by the timing packets can be reduced.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
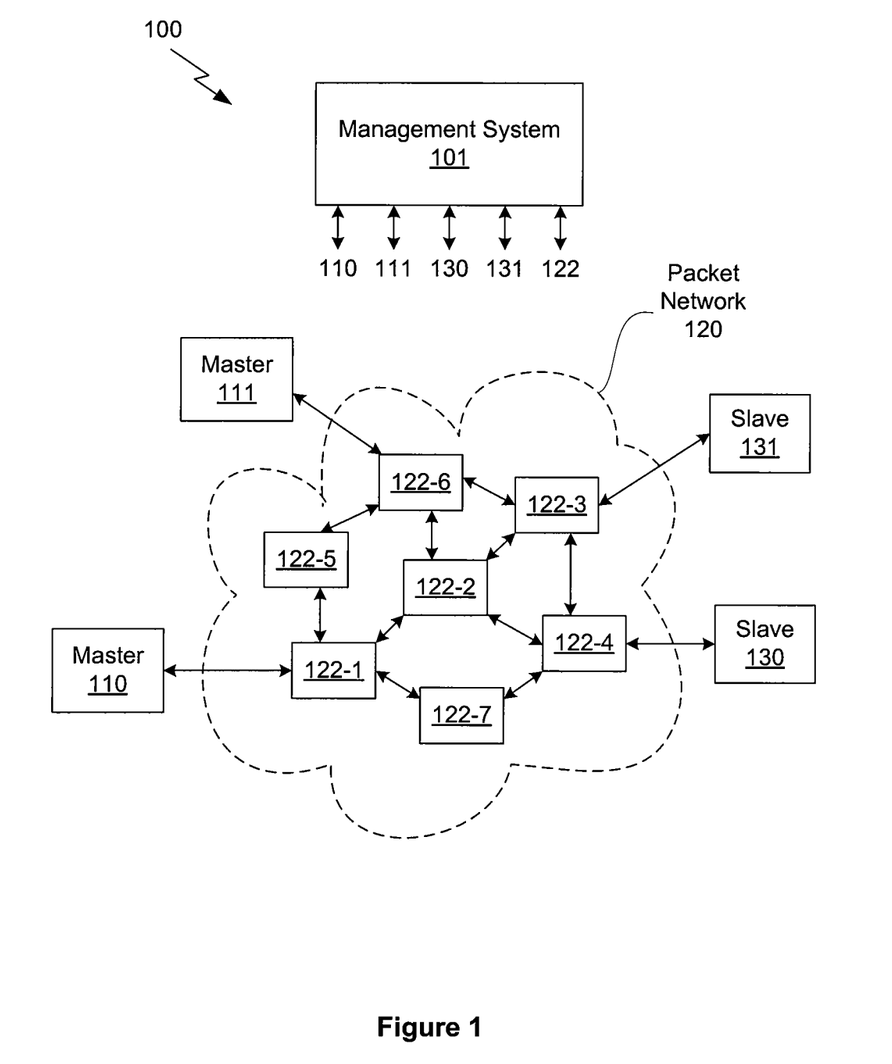
FIG. 1 illustrates a network system configured to implement one or more aspects of the invention.

FIG. 1 illustrates a network system 100 configured to implement one or more aspects of the invention. Network system 100 may include one or more master clocks and one or more slave clocks. In the embodiment illustrated in FIG. 1, network system includes two master clocks, namely master clock 110 and master clock 111, and two slave clocks, slave clock 130 and slave clock 131. The communication path between a master clock and a slave clock is through a packet network 120, which includes a plurality of network elements 122. Network system 100 is managed by a management system 101, which communicates with each of the master clocks, slave clocks, and network elements. Management system 101 is implemented as a computing device that executes software that carries out various network management functions under the control of a network system administrator.

Figure 2:
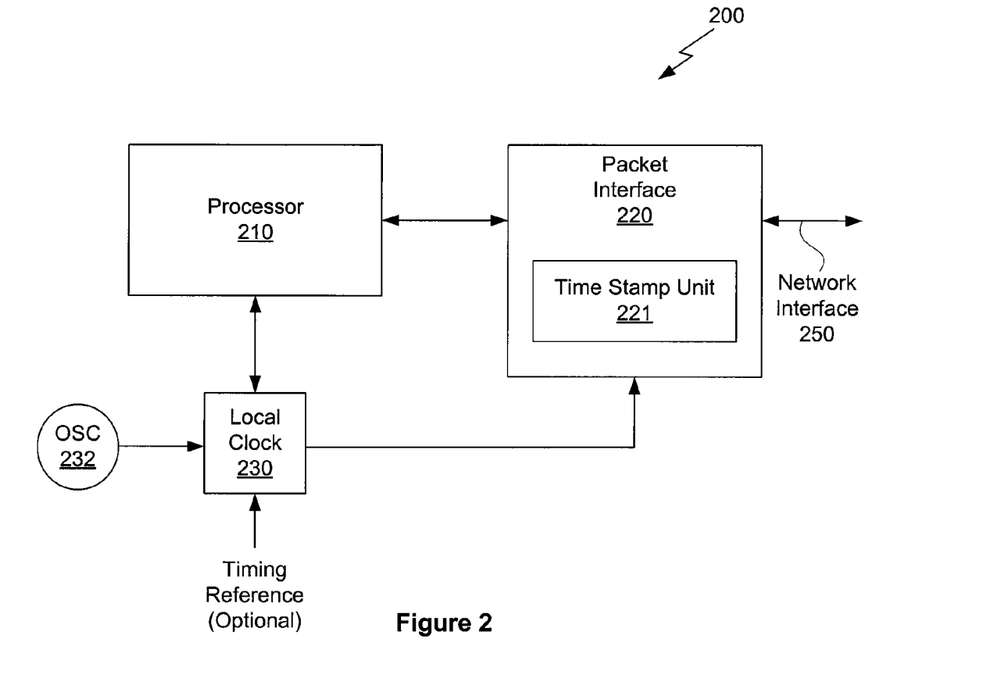
FIG. 2 illustrates one embodiment of a slave clock that can be used in the network system of FIG. 1.
Figure 3:
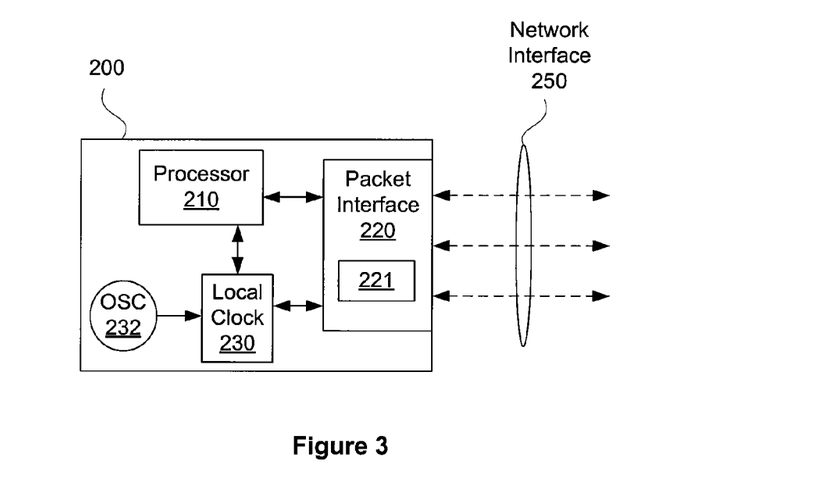
FIG. 3 illustrates another embodiment of a slave clock that can be used in the network system of FIG. 1.

FIG. 2 illustrates one configuration of a slave clock of FIG. 1. Slave clock 200 includes a processor 210, a packet interface 220 having a time stamp unit 221, a local clock 230, and a local oscillator 232. In this configuration, local clock 230 is driven by a local oscillator 232 and provides local time to processor 210 and time stamp unit 221. Packet interface 220 is coupled to packet network 120 via a network interface 250 and time stamps packets as they are received and transmitted via network interface 250. The time stamping function is carried out by time stamp unit 221 based on local time supplied by local clock 230. In one embodiment, packet interface 220 is a packet probe which is described in U.S. patent application Ser. No. 12/558,297, the entire contents of which are incorporated by reference herein. In other embodiments, packet interface 220 may be a packet interface that is used in conventional PTP slave clocks. Processor 210 is programmed to compute the various metrics and perform the analytics as described below, based on the timing information associated with the received packets. It is also possible for these computations to be performed in a separate computing device, such as a personal computer, though such computations are usually not in real-time and are performed on data collected and stored for batch-type processing. In some configurations of the slave clock, processor 210 is programmed to provide multiple virtual paths out to packet network 120. FIG. 3 is a schematic diagram that illustrates the different virtual paths from slave clock 200 to packet network 120.

In network system 100, the master clocks are coupled to highly accurate timing sources and are placed in the network in a distributed manner so that they can be accurate timing sources for the slave clocks. The alignment of a slave clock to a master clock may be performed in frequency and in time. In the embodiments of the invention described herein, any of the alignment procedures known in the art may be used. However, there are many possible routes between the master clock and the slave clock. Some routes may be better than others and, according to the embodiments of the invention, the routes are analyzed according to various metrics and the "best" route is selected.

Figure 4:
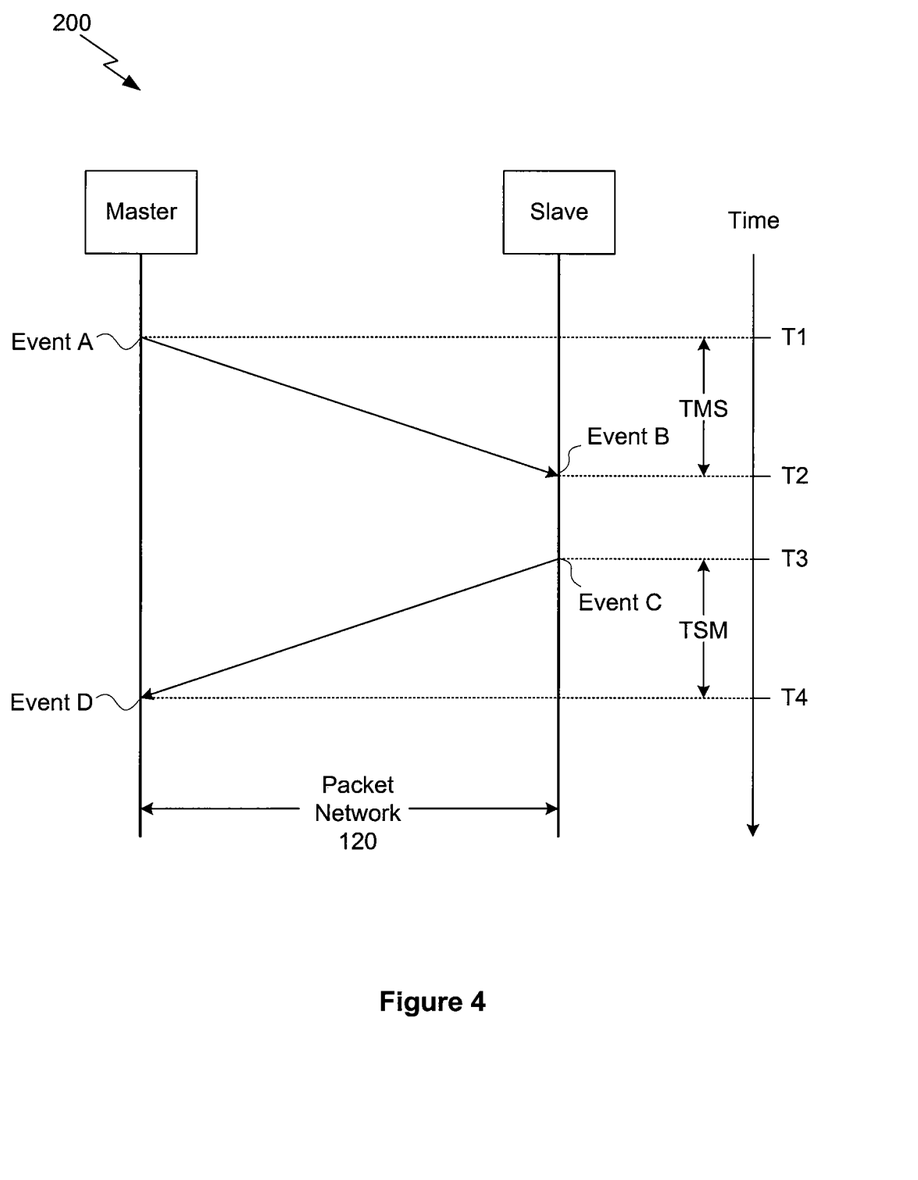
FIG. 4 illustrates relative timings of a timing packet transmitted between a master clock and a slave clock.

FIG. 4 illustrates relative timings of a timing packet transmitted between a master clock and a slave clock. At Event A, a first packet is transmitted by the master and time-of-departure is T1. At Event B, the first packet arrives at the slave that measures the time-of-arrival as t2; assuming that the slave time error is E, the actual time-of-arrival is T1=t2+E. At Event C, a second packet is transmitted by the slave that notes the time-of-departure is t3, and assuming that the slave time error is E, the actual time-of-departure is t3+E. At Event D, the second packet arrives at the master that measures time-of-arrival as T4. Such a two-way exchange of packets can provide information suitable for allowing the slave to align in time with the master (assuming that both sides have knowledge of the time stamps, which can be provided by management system 101). If the exchange of information is only one-way, from master to slave (referred to as the forward direction), the slave can still align its clock (frequency) with the master. One-way methods, where the time-stamped packets flow from slave to master can be employed provided the mechanism (e.g., management system 101) is available for the slave to obtain the results of the master measuring time-of-arrival at the master.

The two-way exchange involves one packet (message) in each direction, and they do not necessarily have to be consecutive as long as the time stamp information is communicated appropriately. In some instances, the rate at which packets are transmitted in the two directions can be different. Denoting by TMS and TSM, the transit delays between the master and slave and vice versa, the following equations can be established: T4=t3+E+TSM and T1=t2+E−TMS. In an actual time-transfer situation there are two equations with three unknowns, so it is common to assume reciprocity of transit delay between the two devices, thereby reducing the number of unknowns to 2 and therefore computing E, the slave time error.

Because of the fundamental statistical behavior of packet networks, the transit delays are not fixed and can vary from packet to packet. To counter this packet delay variation, as well as to account for any drift in the slave clock oscillator, the estimates of clock offset are made routinely and it is known that the mitigation of the deleterious effects of packet delay variation and oscillator drift is improved by using more frequent exchanges of timing packets.

For measurement and monitoring purposes, a probe device can be installed instead of a slave or in parallel with a slave. One example of a probe device is disclosed in U.S. patent application Ser. No. 12/558,297. If the probe has its own timing reference (e.g. GPS) and is therefore, by design, locked to the same reference as the master then, in the situation of a probe, the slave time error is moot and the two equations provide measurements of TMS and TSM, the transit delays between the master and the slave. If the probe does not have a common timing reference with the master but if it does have a high quality oscillator that, for the measurement period of interest, has sufficient stability for an accurate measurement to be made, such as an OCXO (oven controlled crystal oscillator) or a Rubidium atomic standard, then the probe can still establish the stability of the timing signal implicit in the time stamp exchange over the packet network segment.

Based on the timing information collected with the exchange of timing packets, certain metrics are now described. In the embodiments of the invention, the following metrics are employed: MTIE metrics and TDEV metrics. These metrics may be developed with or without an accurate timing reference at the slave. The qualifier "operational" is used to imply that the metric is developed using time error data collected by a slave in operation (i.e., no accurate timing reference at the slave). In either case, details on the development of these metrics using the timing information collected with the exchange of timing packets are covered in Chapter 2, Section 2.3 of Kishan Shenoi, *Synchronization and Timing in Telecommunications*, On Demand Publishing, ISBN 1-4392-2632-6 (2009).

The metrics described above are one-way metrics based on either TMS or TSM. The one-way metrics are used to evaluate a path for frequency alignment. In certain applications, such as selecting the best path for time and frequency alignment, two-way metrics based on round-trip delay and asymmetry in the forward and reverse directions. The development of two-way metrics using the timing information collected with the exchange of timing packets are covered in Chapter 2, Section 2.3 of Kishan Shenoi, Synchronization and Timing in Telecommunications, On Demand Publishing, ISBN 1-4392-2632-6 (2009).

In a deployment environment, results of metric computations are needed in near-real time. The natural consequence is that the data set size over which the metrics are computed is necessarily finite and, furthermore, is constrained in time. For operational metrics, where the slave device is making transit delay measurements based on its internal (stabilized and disciplined) clock, the measurement window must be commensurate with the quality of the oscillator in the device. That is, over the measurement interval the oscillator must be sufficiently stable so as not to color the data with its own imperfections. For oven controlled oscillators (OCXO) this interval of stability is generally in the range of 1000s to 10,000s (the window of stability is directly related to the cost of the oscillator). This window of stability is one of the governing factors that determine the maximum size of the data set over which the metrics are computed.

For near real-time applications, some allowance needs to be made for frequency drift. In the case of a slave device, some allowance must be made for the fact that there may be a residual frequency offset between the master and the slave. This is generally small, of the order of a few ppb (parts per billion) but does restrict the effective stability window to the range of about 1000s to 10,000s, depending again (indirectly) on the quality of the oscillator. In the case of a probe, if the probe and the master are synchronized to different accurate timing sources, the possible frequency offset between the two (original) sources needs to be considered, and this would restrict the effective stability window depending on the amount of the frequency offset.

In addition, recognizing that the behavior of a packet network is statistical by nature and the packet delay variation introduced by the network is dependent on several factors including loading, which can be quite variable, the measurement window should be chosen such that the network characteristics do not change significantly over that time period.

For near real-time applications, the observation interval is selected based on the above considerations. In one embodiment, this observation window is selected as 64 seconds. In the embodiments of the invention described herein, overlapping measurement data sets are used. That is, assuming a data set size (observation window) of X seconds, the next data set of X seconds can include some portion of the prior data set. That is, the interval between calculation of the metrics will be less than, or equal to, X seconds and no packet data is missed (though specific transit delay values may be disregarded as part of the selection process in the metric). In one embodiment, the overlap is 50%.

There are other metrics that are based on the time error sequence and provide guidance regarding potential performance of the slave clock. Skewness and excess kurtosis are two examples of other metrics. These metrics are valuable to characterize the shape of the probability distribution. It has been established that extraction of stable timing information is more robust when the probability distribution shape is such that the peak of the distribution occurs for small values of delay and the distribution tails off with increasing delay. The skewness metric captures this behavior. Associated with skewness is the excess kurtosis metric. This metric identifies whether the distribution is symmetric or not. For timing transfer purposes, an asymmetric distribution, equivalently a (large) positive value for excess kurtosis, with a (large) positive value for skewness is most appropriate. The calculations for these parameters use the set of transit time (delay) estimates, $\{x_k; k=0,1,\ldots,(N-1)\}$. Specifically:

$$EK = \frac{\sum_{k=0}^{(N-1)} (x_k - \bar{x})^4}{(N-1)\sigma^4} - 3$$

$$SK = \frac{\sum_{k=0}^{(N-1)} (x_k - \bar{x})^3}{(N-1)\sigma^3}$$

where EK and SK are the excess kurtosis and skewness, respectively. These metrics are computed on a continual basis over short intervals, typically 64s, typically overlapping by about 50%. With this an estimate of EK and SK is available every (approximately) twice every minute. Any significant change from interval to interval is an indication that there has been a significant change in loading conditions in one or more nodes in the path being monitored.

There are several useful management actions that enhance the overall performance of packet networks and in some cases specifically the behavior of slave clock devices. Some of these are discussed below.

Figure 5:
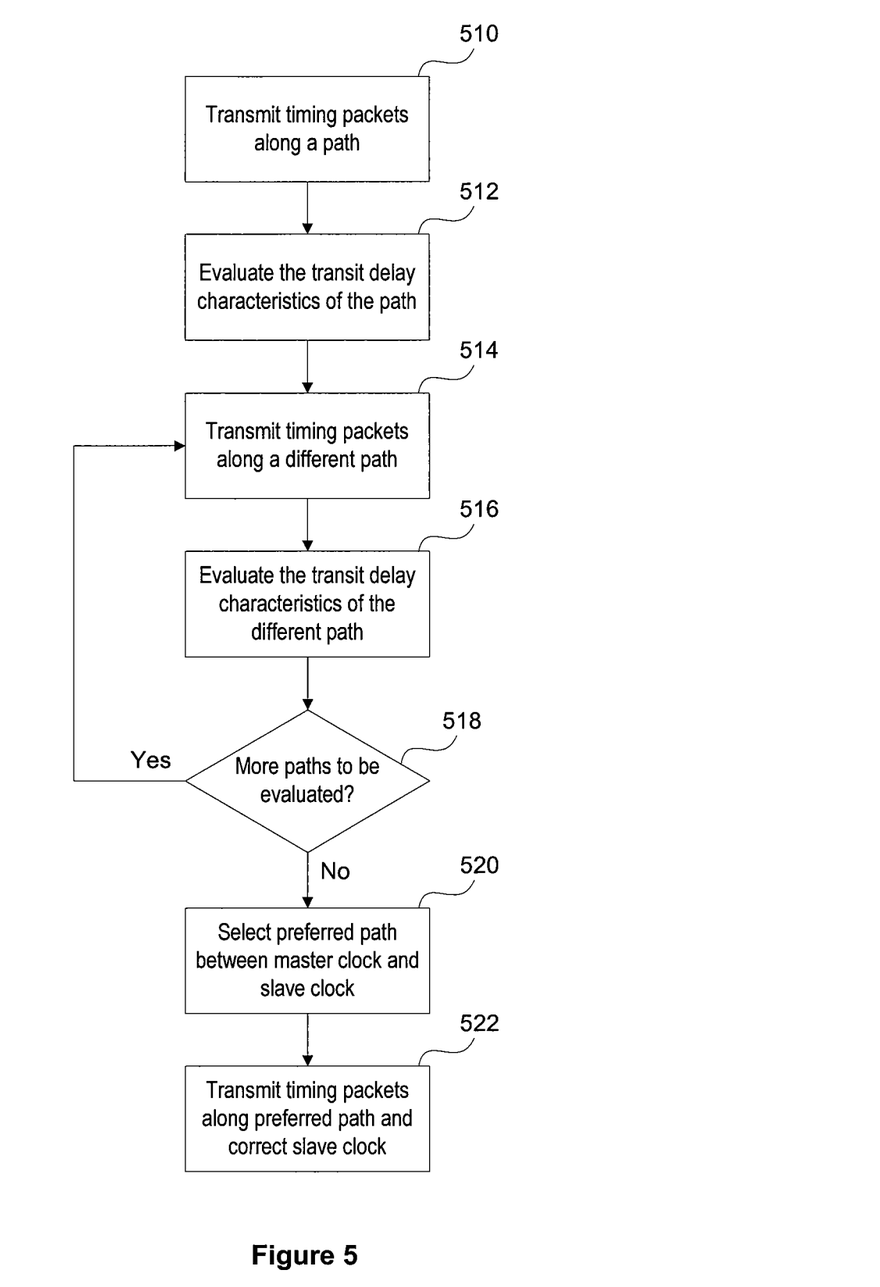
FIG. 5 is a flow diagram of method steps for finding and selecting a preferred path between a master clock and a slave clock.

FIG. 5 is a flow diagram of method steps for finding and selecting a preferred path between a master and a slave. Using this method, the slave autonomously evaluates different paths based on any of the metrics described above, and selects the preferred path. Specifically, the slave can choose which master to synchronize to, in the case of multiple masters, as well as choose which path to accept timing information over, in the case of multiple paths to a master.

At step 510, timing packets are transmitted along a first path from the master to the slave. At step 512, the transit delay characteristics of the first path is evaluated using any of the metrics (TDEV, MTIE, skewness, or excess kurtosis) described above. Steps 514 and 516 essentially repeat steps 510 and 512 for one or more different paths depending on the decision at step 518. The preferred path is selected based on the metrics at step 520 and timing packets between the master and the slave are transmitted along this selected path at step 522. The routing of the timing packets along this selected path is controlled by management system 101 by updating routing tables at network elements 122 or by appending multi-protocol labels to the timing packets to cause the timing packets to be routed along this selected path.

In one embodiment, the different paths that are evaluated according to this method are between the same master and the same slave. In another embodiment, the different paths that are evaluated according to this method are between two or more masters and the same slave, where the slave has two or more virtual interfaces as shown in FIG. 3.

Generally, and in particular in PTP, the slave synchronizes itself to a designated master. However, it may be difficult to decide whether the master in question is reliable or not. This requires a reference. As shown in FIG. 3, a slave can have multiple virtual interfaces. This feature can be used to extract information regarding the master in question. This is particularly important in the case of boundary clocks (BCs). A BC is like a synchronization repeater. On one side (also called "upstream") it acts as a slave clock device and synchronizes to a master clock over the medium of connectivity. On the other side it acts like a master clock for synchronizing "downstream" slave clocks. The slave entity of a boundary clock synchronizes itself to the master entity across a single link, assuming all network elements are boundary clock equipped. If some network elements are not BC equipped then the link between the slave and master entities of communicating boundary clocks may have one or more intervening network elements ("hops"). Suppose the slave has two virtual interfaces (data sets), A being the primary and B an alternate (used mainly for monitoring). The network management system can establish a link between slave-A and its designated master (e.g., master-A). In the case of a BC, this master is likely to be at the other end of the physical link. The slave-B entity is designated a different master (e.g., master-B) preferably not too many hops away. The device then develops two time sequences corresponding to these two master-slave connections, denoted by $\{x_k\}$ and $\{y_k\}$. It is possible that these two have different packet rates. It is straightforward to establish some interval that includes multiple samples of each sequence.

In order to compare two masters (master-A and master-B), the slave device can create a time-error sequence that is, effectively, the difference between the two sequences denoted by $\{x_k\}$ and $\{y_k\}$. If the two masters are operating correctly then the difference sequence MTIE/TDEV would meet the mask for large observation interval that is generated according to a given quality level of the masters. The large observation interval is chosen to be greater than the (known) time-constant of the slave clock recovery loop. If the two masters differ in frequency then the difference sequence MTIE will exhibit a linear behavior for large observation interval and the slope will be indicative of the frequency offset between the masters (if any). If a third slave, slave-C, and a third master, master-C, can be identified and compared pair-wise, the likelihood of identifying the bad master would increase.

If any of network elements 122 are equipped with boundary clocks or transparent clocks, the techniques according to embodiments of the invention may be used to detect boundary clocks or transparent clocks that are not operating properly. For faulty boundary clock detection, this can be done by computing the metrics described above along different paths, one that includes one or more boundary clocks and one that does not. The computed metrics for the two paths should provide an indication as to whether the boundary clocks are or are not operating properly. For faulty transparent clock detection, this can be done by computing the metrics described above along a path that includes one or more transparent clocks. The computed metrics for the two cases should provide an indication as to whether the transparent clocks are or are not operating properly.

It is further contemplated that the examination of the metrics described above provides information regarding the health of the network. Specifically, fault isolation is possible by examining metrics that can be linked to paths and the faulty equipment is identified as at the intersection of paths whose metric values indicate degraded or failed performance. Also, congestion can be identified in much the same way as fault isolation. This requires the notion of historical metrics. Metrics such as TDEV that are computed routinely over time will show a gradual increase if there is a systemic increase in traffic load. Spikes in the metrics identify peak, albeit, transient, over-loading.

While the forgoing is directed to embodiments of the invention, other and further embodiments of the invention may be devised without departing from the basic scope thereof. For example, aspects of the invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the invention, are embodiments of the invention.

We claim:

1. A method of routing a timing packet between a master clock and a slave clock of a packet network, comprising the steps of:
   transmitting a first set of timing packets between the master clock and the slave clock along a first path;
   evaluating a transit delay characteristic of the first path based on timing information contained in the timing packets of the first set, wherein the transit delay characteristic is evaluated using at least one of an MTIE metric, a TDEV metric, a two-way metric based on asymmetry in forward and reverse directions, a skewness metric, and an excess kurtosis metric;
   transmitting a second set of timing packets between the master clock and the slave clock along a second path;
   evaluating a transit delay characteristic of the second path based on timing information contained in the timing packets of the second set, wherein the transit delay characteristic is evaluated using at least one of an MTIE metric, a TDEV metric, a two-way metric based on asymmetry in forward and reverse directions, a skewness metric, and an excess kurtosis metric; and
   controlling future timing packets to be transmitted between the master clock and the slave clock along the path that has a better transit delay characteristic.

2. The method according to claim 1, wherein the step of controlling includes the step of:
   updating routing tables at nodes that are included in the path that has the better transit delay characteristic.

3. The method according to claim 1, wherein the step of controlling includes the step of:
   appending a multi-protocol label to the future timing packets,
   wherein the future timing packets are routed along the path that has the better transit delay characteristic based on the multi-protocol label.

4. The method according to claim 1, wherein the timing information contained in the timing packets include a transmit time stamp and a receive time stamp.

5. The method according to claim 1, wherein the timing information contained in the timing packets include a transmit time stamp of the master clock, a receive time stamp of the slave clock, a transmit time stamp of the slave clock, and a receive time stamp of the master clock.

6. The method according to claim 1, wherein the first path includes at least one transparent clock and the step of evaluating the transit delay characteristics of the first path and the second path ignores timing data inserted into the timing packets by the transparent clock.

7. The method according to claim 1, further comprising:
   correcting the slave clock based on the future timing packets.

8. A method of selecting a master clock for use in correcting a slave clock, comprising:
   transmitting a first set of timing packets between a first master clock and the slave clock along a first path;
   evaluating a transit delay characteristic of the first path based on timing information contained in the timing packets of the first set; wherein the transit delay characteristic is evaluated using at least one of an MTIE metric, a TDEV metric, a two-way metric based on asymmetry in forward and reverse directions, a skewness metric, and an excess kurtosis metric;

transmitting a second set of timing packets between a second master clock and the slave clock along a second path;

evaluating a transit delay characteristic of the second path based on timing information contained in the timing packets of the second set; and selecting one of the first master clock and the second master clock for use in correcting the slave clock based on the transit delay characteristics of the first path and the second path.

9. The method according to claim 8, wherein the master clock associated with the path that has the better transit delay characteristic is selected.

10. The method according to claim 8, wherein the first and second paths traverse nodes of a packet network, and the slave clock has a single physical interface an end node of the packet network and multiple virtual interfaces to the end node of the packet network.

11. The method according to claim 10, wherein the packets transmitted along the first path travel across a first virtual interface to/from the end node and the packets transmitted along the second path travel across a second virtual interface to/from the end node.

12. The method according to claim 8, further comprising:
correcting a frequency of the slave clock based on the timing packets received from said one of the first master clock and the second master clock and the timing information in the timing packets,
wherein the timing information contained in the timing packets include a transmit time stamp of the master clock and a receive time stamp of the slave clock.

13. The method according to claim 8, further comprising:
correcting a frequency of the slave clock based on the timing packets received from said one of the first master clock and the second master clock and the timing information in the timing packets,
wherein the timing information contained in the timing packets include a transmit time stamp of the slave clock and a receive time stamp of the master clock.

14. The method according to claim 8, further comprising:
correcting time and frequency of the slave clock based on the timing packets received from said one of the first master clock and the second master clock and the timing information in the timing packets,
wherein the timing information contained in the timing packets include a transmit time stamp of the master clock, a receive time stamp of the slave clock, a transmit time stamp of the slave clock, and a receive time stamp of the master clock.

15. A computer network comprising:
one or more master clocks;
one or more slave clocks;
a plurality of network elements between the master clocks and the slave clocks; and
a network management system coupled to each of the master clocks, the slave clocks, and the network elements, the network management system being configured to route timing packets from one of the master clocks to each of the slave clocks along each slave clock's respective preferential path,
wherein each of the preferential paths is determined based on transit delay characteristics evaluated for paths between the one of the master clocks and a respective slave clock, the transit delay characteristics being evaluated based on timing information contained in timing packets using at least one of an MTIE metric, a TDEV metric, a two-way metric based on asymmetry in forward and reverse directions, a skewness metric, and an excess kurtosis metric.

16. The computer network according to claim 15, wherein the network management system is further configured to update routing tables of the network elements to route the timing packets along each slave clock's respective preferential path.

17. The computer network according to claim 15, wherein the network management system is further configured to direct the network elements to append multi-protocol labels to the timing packets to cause the timing packets to be routed along each slave clock's respective preferential path.

18. The computer network according to claim 15, wherein the network management system is further configured to evaluate a first path and a second path to determine a congested state in a third path.

19. The computer network according to claim 15, wherein the network management system is further configured to evaluate a first path and a second path to determine a faulty transparent clock.

20. The computer network according to claim 15, wherein the network management system is further configured to evaluate a first path and a second path to determine a faulty boundary clock.

* * * * *